No. 708,428. Patented Sept. 2, 1902.
F. VAN ASSCHE.
GREENHOUSE CONSTRUCTION.
(Application filed Apr. 18, 1902.)
(No Model.)
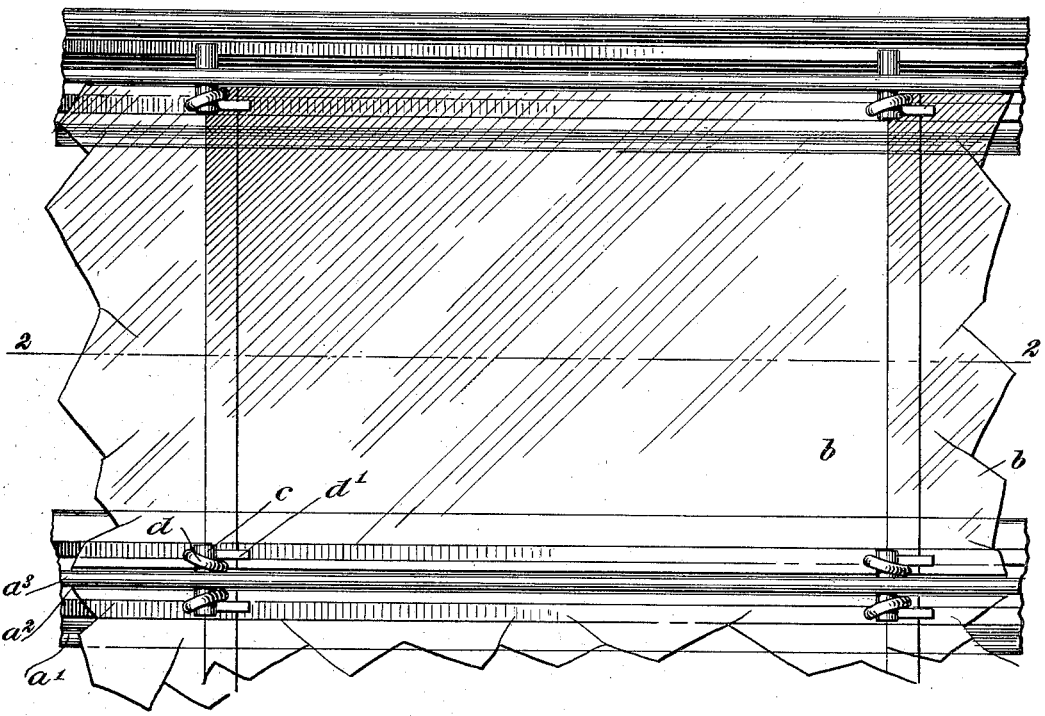
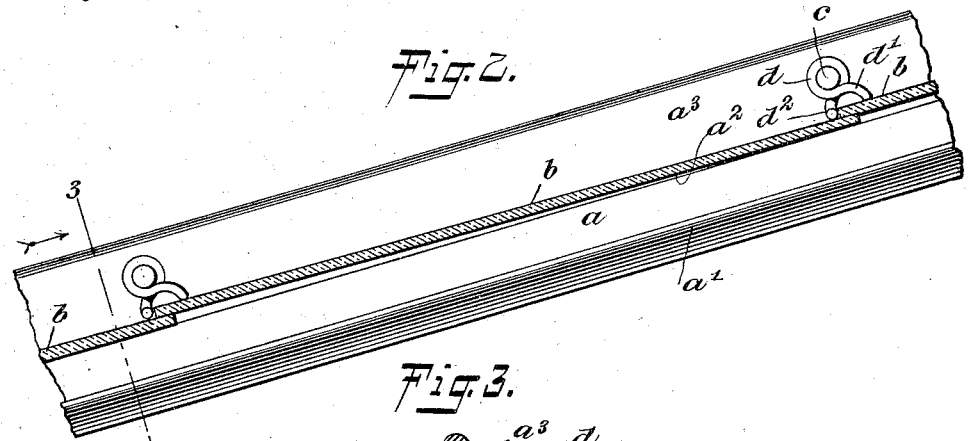
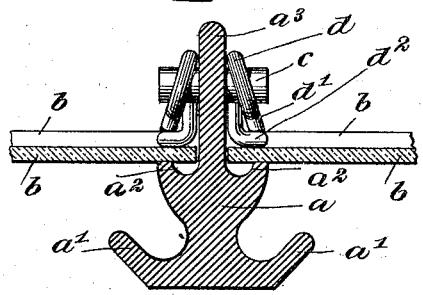
WITNESSES:
William P. Goebel.
Isaac B. Owens.
INVENTOR
Frank Van Assche
BY
ATTORNEYS.

UNITED STATES PATENT OFFICE.

FRANK VAN ASSCHE, OF JERSEY CITY, NEW JERSEY.

GREENHOUSE CONSTRUCTION.

SPECIFICATION forming part of Letters Patent No. 708,428, dated September 2, 1902.

Application filed April 18, 1902. Serial No. 103,534. (No model.)

*To all whom it may concern:*

Be it known that I, FRANK VAN ASSCHE, a citizen of the United States, and a resident of Jersey City, in the county of Hudson and State of New Jersey, have invented new and useful Improvements in Greenhouse Construction, of which the following is a full, clear, and exact description.

The purpose of this invention is to so construct the parts of metal-framed greenhouses as to securely hold the glass plates in position and also to avoid breakage of the glass due to the expansion and contraction of the metallic frame parts.

It has heretofore been a fatal objection to iron-framed greenhouses that the expansion and contraction of the iron parts subjects the glass to destructive strains. By means of my invention I interpose a yielding or spring-like connection between the iron or metallic frame parts of the glass, so that the expansive movements of the iron are not communicated irresistibly to the glass.

Other features of the invention will appear hereinafter.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a plan view of the invention. Fig. 2 is a section on the line 2 2 of Fig. 1, and Fig. 3 is a section on the line 3 3 of Fig. 2.

The frame of the greenhouse is formed of a number of longitudinally-extending bars constructed of galvanized iron or other metal, if desired, and each of these bars comprises a body or main part $a$, at each side of which are longitudinally-disposed troughs $a'$, which serve to receive the water of condensation which forms on the inside of the greenhouse and to conduct the same to the side walls of the greenhouse, where the said water may be properly disposed of. At the upper portion of the body part $a$ and at each side are ledges $a^2$, forming troughs or grooves for the reception of putty or other plastic substance for sealing the glass plates. These ledges $a^2$ also serve the purpose of supporting the glass plates, which elements are indicated at $b$ in the drawings. A vertical longitudinal rib $a^3$ projects upward from the body of the frame-bar and is adapted to extend between the contiguous side edges of the glass plates when the parts are assembled, and this web not only spaces the glass plates properly, but it serves to carry the fastening devices, which will now be described. The glass plates are in the usual rectangular form and are arranged with their end edges overlapping each other in shingle-like relation, as is usual in greenhouse construction, and the fastening devices are applied at each end edge of the plates.

Carried transversely in the web $a$ are pins $c$, these pins projecting from each side of the webs, and fitted to the ends of the pins $c$ are yielding fastenings, which are formed, preferably, of spring-wire bent to produce a coil $d$, encircling the pin, an end $d'$, turned transversely of the pin (see Fig. 3) and bearing on the end of the top plate, and an end $d^2$, which passes under the pin and is then turned laterally of the frame-bar, so as to lie on the bottom plate and directly against the adjacent edge of the top plate. These ends $d'$ and $d^2$ bear with spring-pressure on the respective plates, and therefore the plates are held snugly and securely; but it will be observed that no possible amount of expansion or contraction of the frame-bar will be transmitted by these spring parts to the glass plates in such a manner as to break them. The spring-fastenings will yield in accord with the contraction and expansion of the frame-bars, and therefore no unyielding pressure can be transmitted to the glass plates.

Various changes in the form and details of my invention may be resorted to at will without departing from the spirit of my invention. Hence I consider myself entitled to all forms of the invention as may lie within the intent of my claims.

Having thus described my invention, I claim as new and desire to secure by Letters Patent—

1. In greenhouse construction, the combination of the metallic frame part, the glass plate, and a yielding or spring-like fastening extending between the metallic frame-bar and the glass plate, for the purpose specified, said fastening being formed of spring-wire bent to produce an intermediate coil for engagement with the said frame part and end portions separated from each other to engage the glass at different points thereon.

2. In greenhouse construction, the combination of the metallic frame-bar having the longitudinally-disposed web, the glass plates lying on the frame-bar at opposite sides of the web, a transverse pin carried in the web, and two separate yielding or spring-like fastenings carried respectively on the ends of the pin at each side of the web, and each fastening having two ends bearing on said glass plates, for the purpose specified.

3. In greenhouse construction, the combination of the metallic frame-bar having the longitudinally-disposed web, the glass plates lying on the frame-bar at opposite sides of the web, a transverse pin carried in the web, and yielding or spring-like fastenings at the ends of the pin and bearing on the glass plates, for the purpose specified, said fastenings being formed of spring-wire bent to produce an intermediate coil encircling the pin and end portions separated from each other to engage the glass plates at different points.

4. The combination of the metallic frame part, a pin carried thereby, overlapping glass plates resting on the frame part, and a spring-fastening comprising a length of spring-wire bent to produce an intermediate coil encircling the pin and end portions separated from each other, one end portion lying on top of the top plate and the other end portion lying on top of the other plate and against the adjacent edge of the top plate.

5. The combination of the metallic frame part, a pin carried thereby, overlapping glass plates resting on the frame part, and a spring-fastening comprising a length of spring-wire bent to produce an intermediate coil encircling the pin and end portions separated from each other, one end portion lying on top of the top plate and the other end portion lying on top of the other plate and against the adjacent edge of the top plate, the last-named end of the spring-fastening being turned laterally with respect to the frame part, so as to engage its side with said edge of the top glass plate.

6. A spring-fastening for greenhouse construction, said fastening being formed of a length of spring-wire bent to produce an intermediate coil and having its end portions projected oppositely from each other to bear on the glass plates at different points, one of said end portions being turned laterally to present its side to the end edge of one adjacent glass plate.

In testimony whereof I have signed my name to this specification in the presence of two subscribing witnesses.

FRANK VAN ASSCHE.

Witnesses:
 D. SMITH HAZARD,
 M. M. VERE.